US007283307B2

(12) United States Patent
Couture et al.

(10) Patent No.: US 7,283,307 B2
(45) Date of Patent: Oct. 16, 2007

(54) COMMON APERTURE VISION SYSTEM

(75) Inventors: Michael E. Couture, Litchfield, NH (US); Vadim Plotsker, Amherst, NH (US)

(73) Assignee: OASYS Technology, LLC, Manchester, NH (US)

( * ) Notice: Subject to any disclaimer, the term of this patent is extended or adjusted under 35 U.S.C. 154(b) by 126 days.

(21) Appl. No.: 11/176,690

(22) Filed: Jul. 7, 2005

(65) Prior Publication Data

US 2006/0245070 A1    Nov. 2, 2006

Related U.S. Application Data

(60) Provisional application No. 60/585,726, filed on Jul. 7, 2004.

(51) Int. Cl.
*G02B 27/14* (2006.01)
*G03B 21/00* (2006.01)
*G01J 3/50* (2006.01)
*G01N 21/25* (2006.01)
*G01B 11/00* (2006.01)

(52) U.S. Cl. .................. 359/634; 359/618; 359/629; 359/630; 359/637; 353/31; 353/69; 356/419; 356/401; 250/226

(58) Field of Classification Search ........ 359/629–634, 359/637–640, 206, 207, 365, 366, 368, 385, 359/389, 353, 400, 651, 668, 618, 727, 728, 359/859, 245; 353/31, 69, 77, 99, 122, 20; 356/326, 417, 419, 401; 250/226, 330, 332, 250/458.1, 461.1, 461.2, 347; 345/7–9; 348/E5.141, 348/E9.027

See application file for complete search history.

(56) References Cited

U.S. PATENT DOCUMENTS

| 4,215,273 | A | * | 7/1980 | Frosch et al. | ................ 250/347 |
| 4,541,688 | A | * | 9/1985 | Watt et al. | ................... 359/350 |
| 4,795,244 | A | * | 1/1989 | Uehara et al. | ............... 356/401 |
| 5,013,133 | A | * | 5/1991 | Buralli et al. | ................ 359/558 |
| 5,035,472 | A | | 7/1991 | Hansen | |
| 5,039,867 | A | | 8/1991 | Nishihara et al. | |
| 5,137,363 | A | * | 8/1992 | Kosugi et al. | ............... 356/401 |
| 5,140,151 | A | | 8/1992 | Weiner et al. | |

(Continued)

FOREIGN PATENT DOCUMENTS

| EP | 1 153 398 B1 | 11/2001 |
| EP | 1 294 445 B1 | 3/2003 |
| WO | WO 01/26569 A1 | 4/2001 |

OTHER PUBLICATIONS

Paul, Jeffrey, Power Point Presentation "MANTIS Multispectral Adaptive Networked Tactical Imaging System," 16 pages, Apr. 2003.
Erwin, Sarah I., "'Owning in the Night' Means Fusing Sensors,"National Defense, NDIA's Business & Technology Magazine, Nov. 2002.

(Continued)

*Primary Examiner*—Loha Ben
(74) *Attorney, Agent, or Firm*—Hamilton, Brook, Smith & Reynolds, P.C.

(57) ABSTRACT

An optical device comprises a dichroic beamsplitter for splitting an object beam into a reflected beam having a first waveband and a transmitted beam having a second waveband; an astigmatism-correcting lens element, disposed in the optical path of the transmitted beam; and a coma-correcting lens element, disposed in the optical path of the transmitted beam.

27 Claims, 12 Drawing Sheets

U.S. PATENT DOCUMENTS

| | | | |
|---|---|---|---|
| 5,317,144 A * | 5/1994 | Oono et al. | 250/201.5 |
| 5,490,013 A * | 2/1996 | Shimizu et al. | 359/637 |
| 5,497,266 A | 3/1996 | Owen | |
| 5,668,371 A | 9/1997 | Deasy et al. | |
| 5,815,126 A | 9/1998 | Fan et al. | |
| 5,847,879 A * | 12/1998 | Cook | 359/631 |
| 5,910,816 A | 6/1999 | Fontenot et al. | |
| 5,926,283 A * | 7/1999 | Hopkins | 356/419 |
| 6,094,304 A | 7/2000 | Wallace et al. | |
| 6,140,980 A | 10/2000 | Spitzer et al. | |
| 6,169,628 B1 | 1/2001 | Isbell et al. | |
| 6,204,961 B1 | 3/2001 | Anderson et al. | |
| 6,231,192 B1 * | 5/2001 | Konno et al. | 353/69 |
| 6,288,781 B1 * | 9/2001 | Lobb | 356/326 |
| 6,295,170 B1 | 9/2001 | Wallace et al. | |
| 6,316,776 B1 | 11/2001 | Hiramoto et al. | |
| 6,452,572 B1 | 9/2002 | Fan et al. | |
| 6,529,332 B2 * | 3/2003 | Konno | 359/634 |
| 6,560,029 B1 | 5/2003 | Dobbie et al. | |
| 6,593,561 B2 | 7/2003 | Bacarella et al. | |
| 6,608,682 B2 * | 8/2003 | Ortyn et al. | 356/419 |
| 6,636,185 B1 | 10/2003 | Spitzer et al. | |
| 6,683,584 B2 | 1/2004 | Ronzani et al. | |
| 6,762,884 B2 | 7/2004 | Beystrum et al. | |
| 6,781,127 B1 | 8/2004 | Wolff et al. | |
| 6,898,024 B2 * | 5/2005 | Takeuchi et al. | 359/719 |
| 6,975,400 B2 * | 12/2005 | Ortyn et al. | 356/419 |
| 2002/0030163 A1 | 3/2002 | Zhang | |

OTHER PUBLICATIONS

Chu, W.T. et al., "Instrumentation for Treatment of Cancer Using Proton and Light-ion Beams," *Review of Scientific Instruments*, 64(8):2055-2122, Aug. 1, 1993.

* cited by examiner

COMMON APERTURE VISION SYSTEM

RELATED APPLICATION

This application claims the benefit of U.S. Provisional Application No. 60/585,726 filed on Jul. 7, 2004. The entire teachings of the above application are incorporated herein by reference.

BACKGROUND OF THE INVENTION

Optical sensors and detectors, including night vision systems, often use multiple imaging channels, each operating at a specified waveband. Imaging channels often share a common aperture of an objective piece. In many cases, dichroic beamsplitters are employed to separate the imaging channels. Beamsplitters, however, introduce a number of optical distortions.

SUMMARY OF THE INVENTION

There is a need for an optical multi-waveband common aperture system that eliminates or reduces comatic and astigmatic aberrations.

The present invention is directed to a multi-waveband optical system suitable for use as a vision device that employs at least two imaging channels acquired through a common aperture, each channel separated using a dichroic beamsplitter. An example of a vision device of the present invention is a night-vision system.

In one embodiment, the instant invention is an optical device, comprising a dichroic beamsplitter, an astigmatism correcting lens element and a coma correcting lens element. The dichroic beamsplitter splits an object beam into a reflected beam having a first waveband and a transmitted beam having a second waveband. The astigmatism correcting lens element is disposed in the optical path of the transmitted beam. The coma correcting lens element is disposed in the optical path of the transmitted beam.

In another embodiment, the present invention is a method of displaying images. The method comprises directing an object beam at a dichroic beamsplitter, thereby splitting an object beam into a reflected beam having a first waveband and a transmitted beam having a second waveband, directing the transmitted beam at an astigmatism correcting lens element, thereby correcting the transmitted beam for astigmatic aberration, and directing the transmitted beam at a coma correcting lens element, thereby correcting the transmitted beam for axial coma.

The unique common aperture configuration described herein provides an extremely compact device with well corrected imagery in at least two distinct spectral wavebands that can be combined using image fusion.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Where a beam impinging onto a dichroic beamsplitter has optical power, the beam transmitted through the beamsplitter is distorted. Two principal types of aberrations are introduced into the transmitted beam: astigmatism and axial coma. Astigmatic aberration is a phenomenon in which lines or bars at different orientations are not all simultaneously in focus. As a result, the same point of light becomes imaged as a bar elongated in one of two orthogonal directions depending on the level of focus. Coma is an aberration which causes rays from an off-axis point of light in the object plane to create a trailing "comet-like" blur directed away from the optical axis. A lens with considerable coma may produce a sharp image in the center of the field, but become increasingly blurred toward the edges.

The embodiments described below with reference to FIGS. 1–3 comprises two spectral channels. By inserting additional beamsplitters into the optical train, additional spectral channels can be created. One skilled in the art will understand that the invention disclosed herein can be adapted to operate in an optical system with an arbitrary number of spectral channels.

As used herein, the term "detector" refers to any one or more elements that receives an image in the visible, infrared or other part of optical spectrum and manipulates this image by amplifying its intensity or converting it to the visible spectrum. As used herein, the term "lens element" refers to one or more elements having optical power, such as lenses, that alone or in combination operate to modify an incident beam of light by changing the curvature of the wavefront of the incident beam of light. A "display" can be any surface used to produce a wavefront encoding an image. Examples of displays include CRT-based, LCD-based or gas-plasma-based flat panel displays. In one embodiment, a display can be a projection screen.

Figure 1:
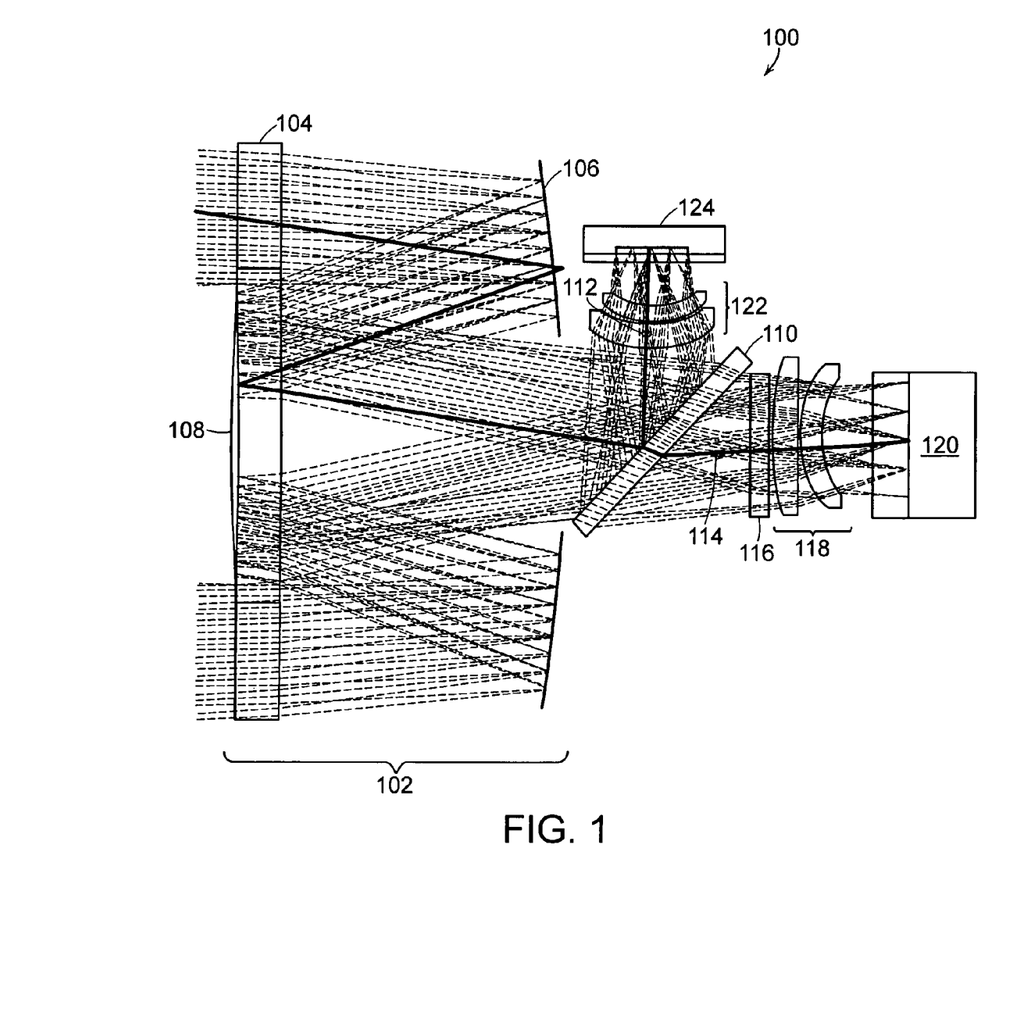
FIG. 1 is a schematic diagram of an embodiment of an objective piece of an optical system of the present invention.

FIG. 1 shows one embodiment of objective piece 100 of an optical device of the present invention. In one embodiment, objective piece 100 comprises a common aperture objective group. In an embodiment shown in FIG. 1, objective piece 100 comprises common aperture catadioptric focusing group 102. Group 102 includes front focusing lens element 104, primary mirror 106, and secondary mirror 108 that is integral with front focusing lens element 104. Preferably, integral front focusing lens element 104 and secondary mirror 108 have distinct surface curvatures. Additional refractive elements (not shown) may be placed in the common path preceding dichroic beamsplitter 110, if required.

Dichroic beamsplitter 110 is a standard device having a multi-layer dielectric stack coating. At beamsplitter 110, one spectral waveband is efficiently reflected by a multi-layer dielectric stack coating, thereby forming reflected beam 112, while another spectral waveband is transmitted by the coating and through beamsplitter 110, thereby forming transmitted beam 114. Other ray traces are shown for clarity. Selection of the dielectric coating suitable for reflecting and transmitting a desired waveband is well within the knowledge of one of ordinary skill in the art. In a preferred embodiment, reflected beam 112 is an infra red (IR) beam, while transmitted beam 114 is a visible light beam.

Correction of the aberrations introduced by beamsplitter 110 is implemented in two ways: astigmatism is corrected by using astigmatism correcting lens element 116 (also referred to as "anamorphic" lens element) and coma is corrected by using decentered lens element 118. For astigmatism correction, toroidal element 116 is placed immediately following beamsplitter 110 as close to the point of introduction of the aberration as possible.

Astigmatism correcting lens element 116 can be toroidal or cylindrical. A cylindrical lens has one plane surface and one cylindrical surface. A toroidal lens has one spherical surface and one toroidal surface. In either case, the refractive power is different in orthogonal axes according to the refractive power in orthogonal planes of symmetry in the anamorphic element; thus the principal focus is a straight line, not a point.

A decentered lens is a lens in which the optical axis does not pass through the geometric center.

Following correction of aberrations, transmitted beam 114 is directed at, in one embodiment, image intensifier tube 120. In another embodiment, a focal point array (FPA) detector (not shown) can replace image intensifier 120.

Reflected beam 112 is directed through additional lens elements 122 at FPA detector 124. Preferably, FPA detector 124 is an IR detector.

One skilled in the art understands that FPA detectors include standard electronic components required for processing the detected images.

Figure 2:
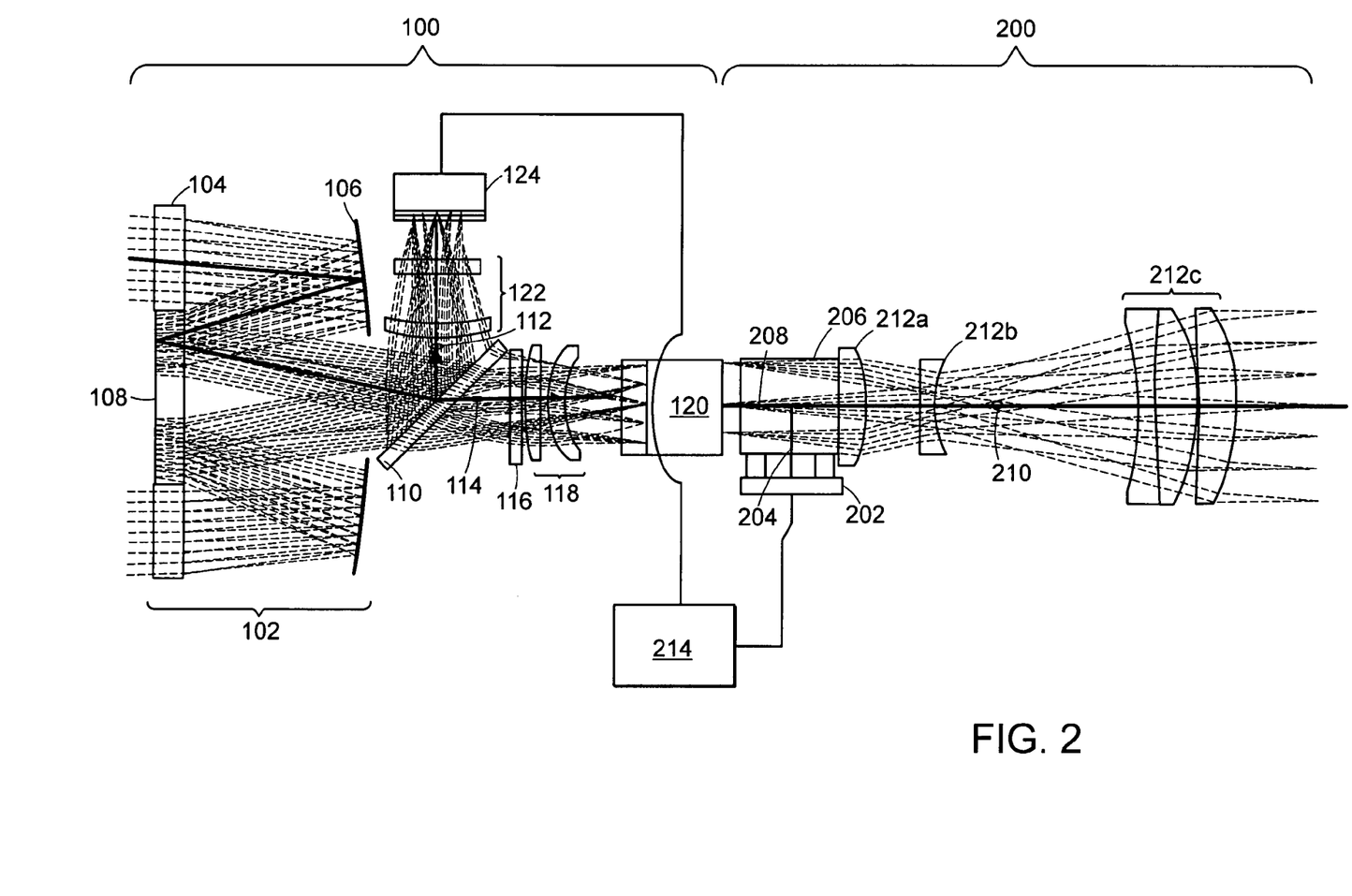
FIG. 2 is a schematic diagram of one embodiment of an optical system of the present invention.

Referring to FIG. 2, both objective piece 100 and an embodiment of eyepiece 200 of the device are shown. FPA detector 124 detects reflected beam 112 and generates a first electrical signal that drives display 202. Display 202 generates first image beam 204 that carries an image detected by FPA detector 124. First image beam 204 is directed at secondary beamsplitter 206. Transmitted beam 114 is directed through image intensifier tube 120 thus producing second image beam 208. First and second image beams 204 and 208 are overlaid and fused into fused image beam 210. Fused image beam 210 is directed through additional lens elements 212A through 212C into an eye of an observer.

Optionally, the device can include programmable processor 214 for processing the first electrical signal.

As mentioned above, in an alternative embodiment, image intensifier tube 120 can be replaced by an additional FPA detector (not shown). In this embodiment, an additional display, driven by an electrical signal generated by the additional FPA detector can be placed adjacent to secondary beamsplitter 206. Beamsplitter 206 will fuse the beams generated by display 202 and the additional display.

Figure 3:
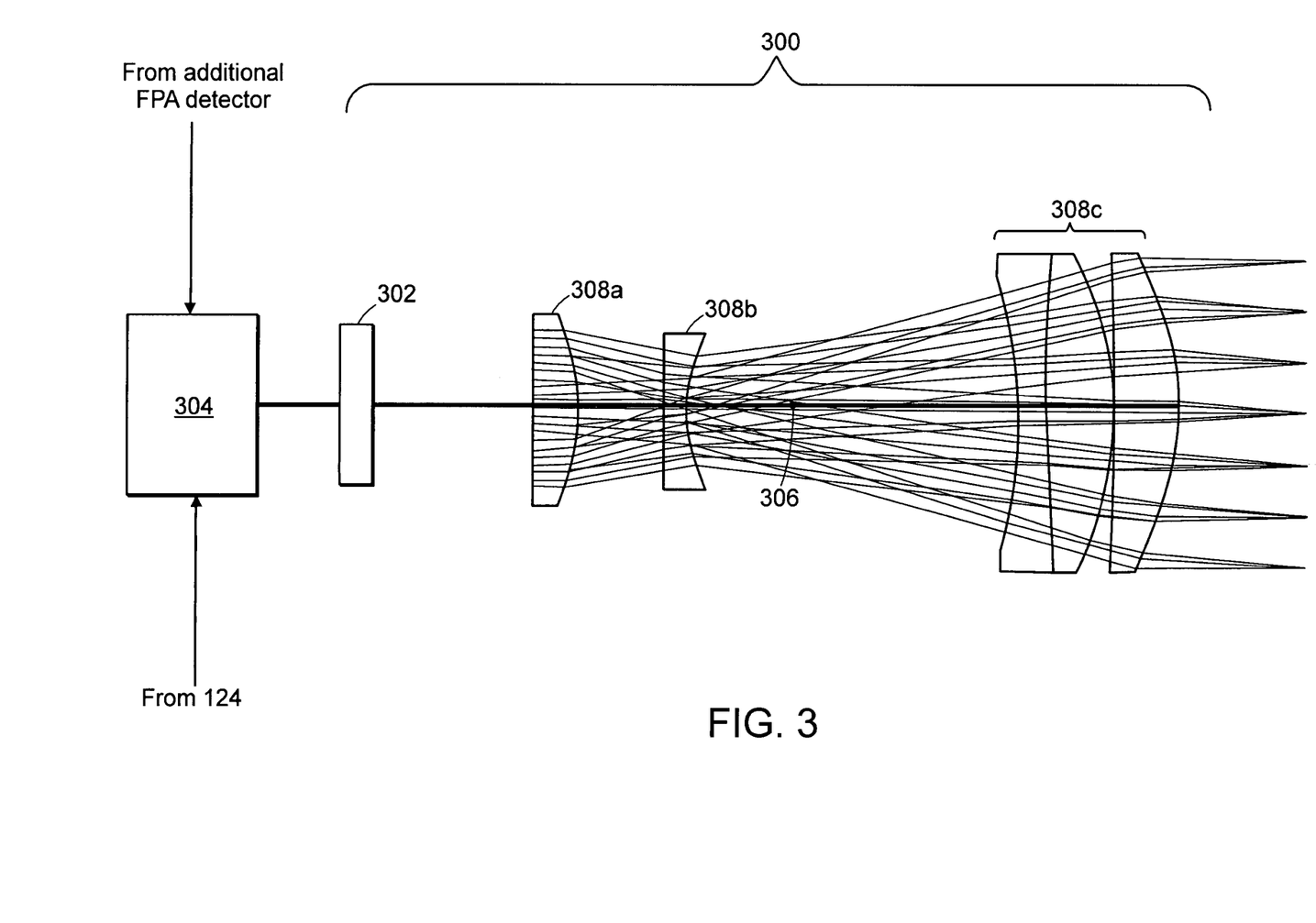
FIG. 3 is a schematic diagram of an alternative embodiment of an eyepiece of the optical system of the present invention.

An alternative embodiment of the device of the invention is shown in FIG. 3. In this embodiment, image intensifier tube 120 is replaced by an additional FPA detector, (not shown). Referring to FIG. 3, eyepiece 300 includes a single display 302. Display 302 is driven by an electrical signal generated by programmable CPU 304. CPU 304 digitally fuses images encoded by the electrical signals generated by FPA detector 124 and an additional FPA detector (not shown). Fused image beam 306, generated by display 302, is directed through lens elements 308A through 308C into an eye of an observer. Selection and implementation of an algorithm for digitally fusing images is well within the knowledge of one of ordinary skill in the art.

EXEMPLIFICATION

Performance of the optical system shown in FIGS. 1–3 was examined by computer simulation by employing ZEMAX Optical Design Program software package.

Figure 4A:
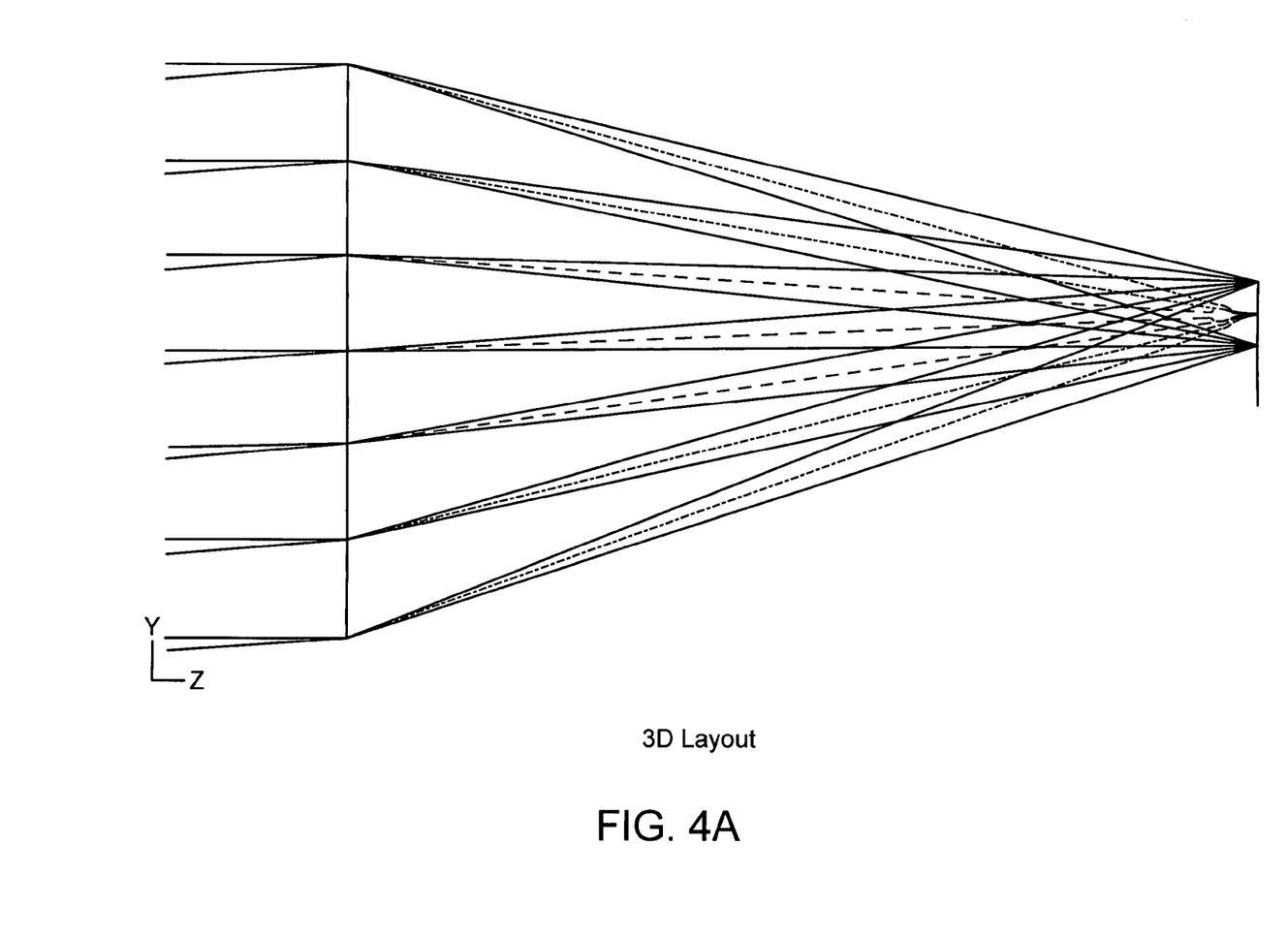
FIG. 4A is a schematic diagram showing traces of rays refracted on a perfect lens.
Figure 4B:
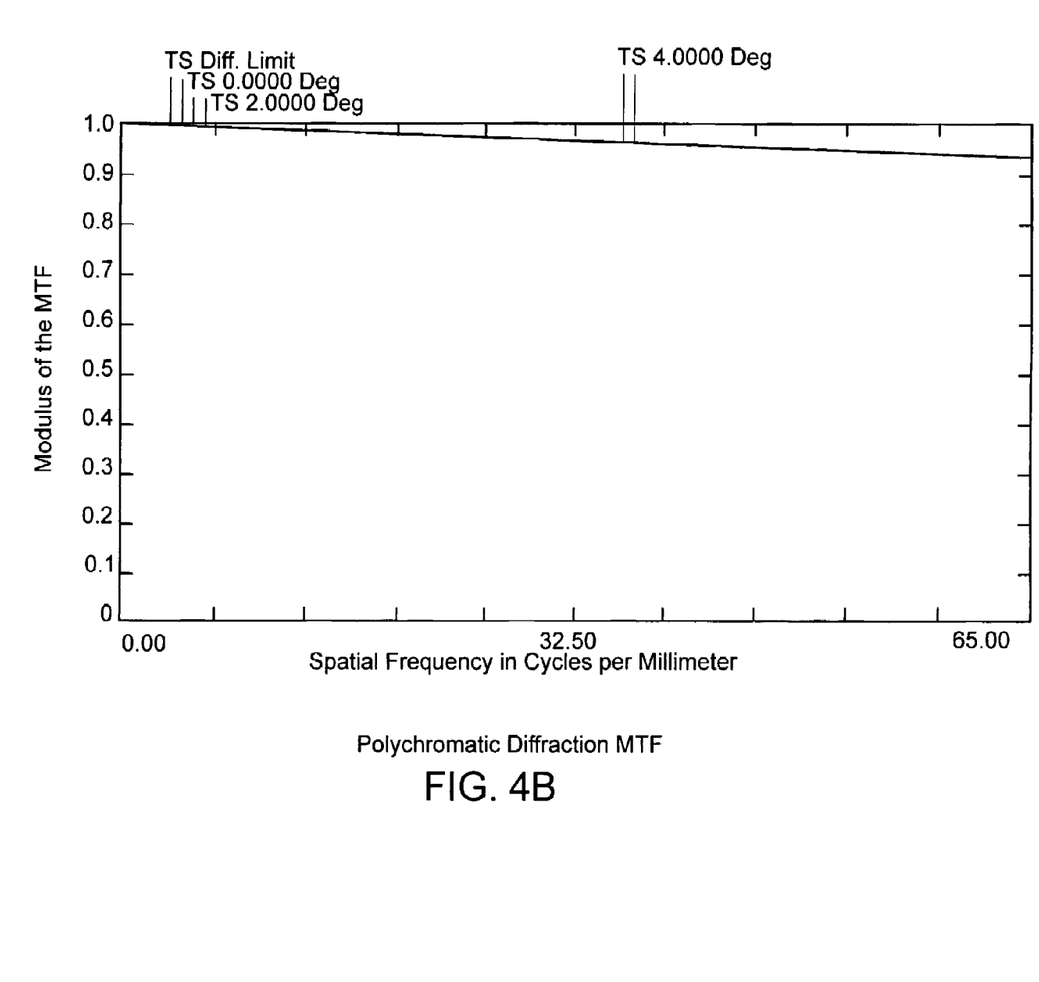
FIG. 4B is a plot showing modulation transfer function (MTF) of a perfect as a function of spatial frequency of an image in line pairs per millimeter.

FIG. 4A is a schematic diagram illustrating refraction of rays through a perfect (aberration-free) lens at a single wavelength and over three field angle positions. FIG. 4B is a plot depicting a modulation transfer function (MTF) of the perfect lens as a function of spatial frequency of lines (line pairs per millimeter). As can be seen the MTF is indistinguishable and is in fact equal to the diffraction limit determined by the lens wavelength, aperture, and focal length.

Figure 4C:
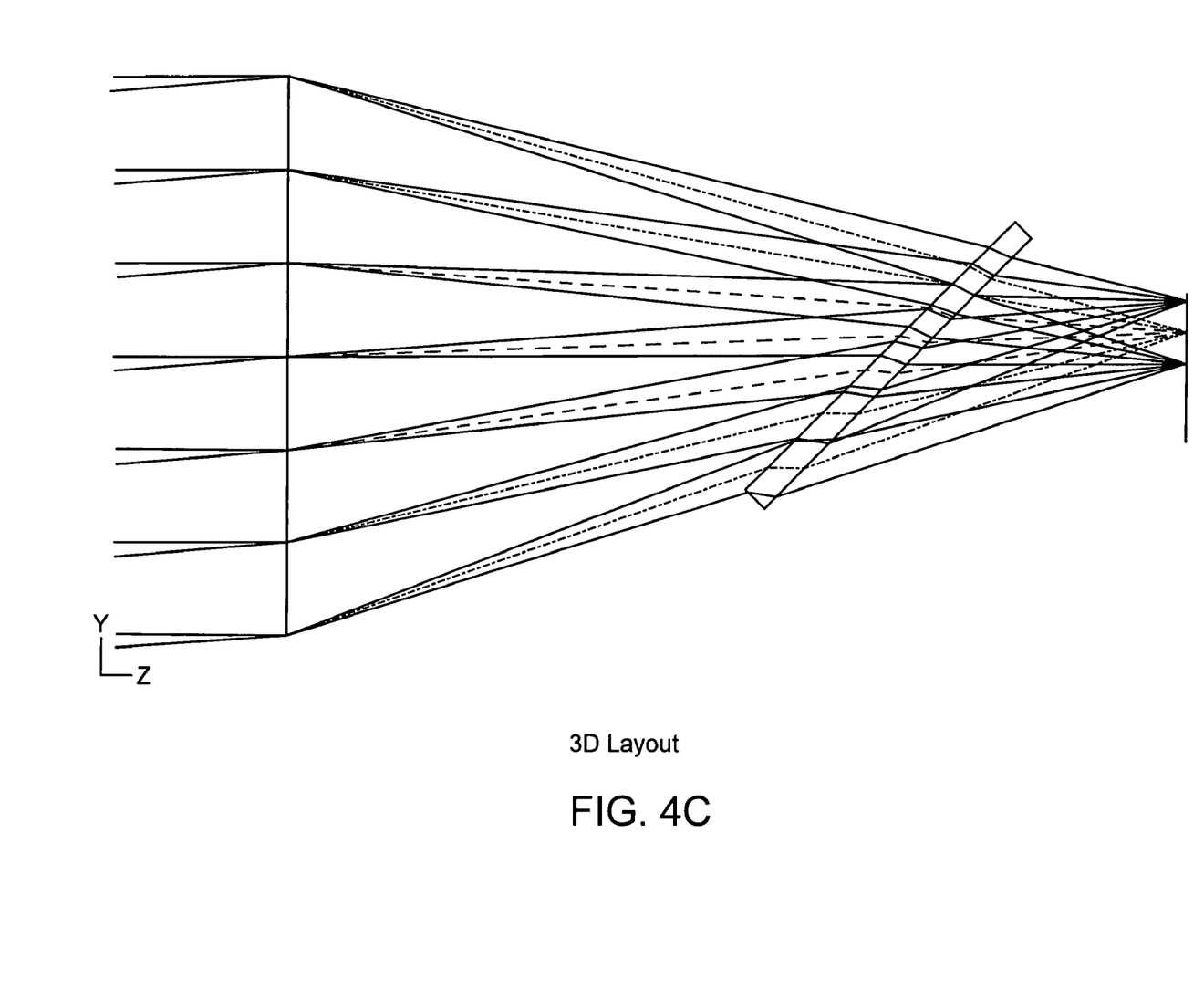
FIG. 4C is a schematic diagram showing traces of rays refracted on an optical system comprising a perfect lens and a beamsplitter.
Figure 4D:
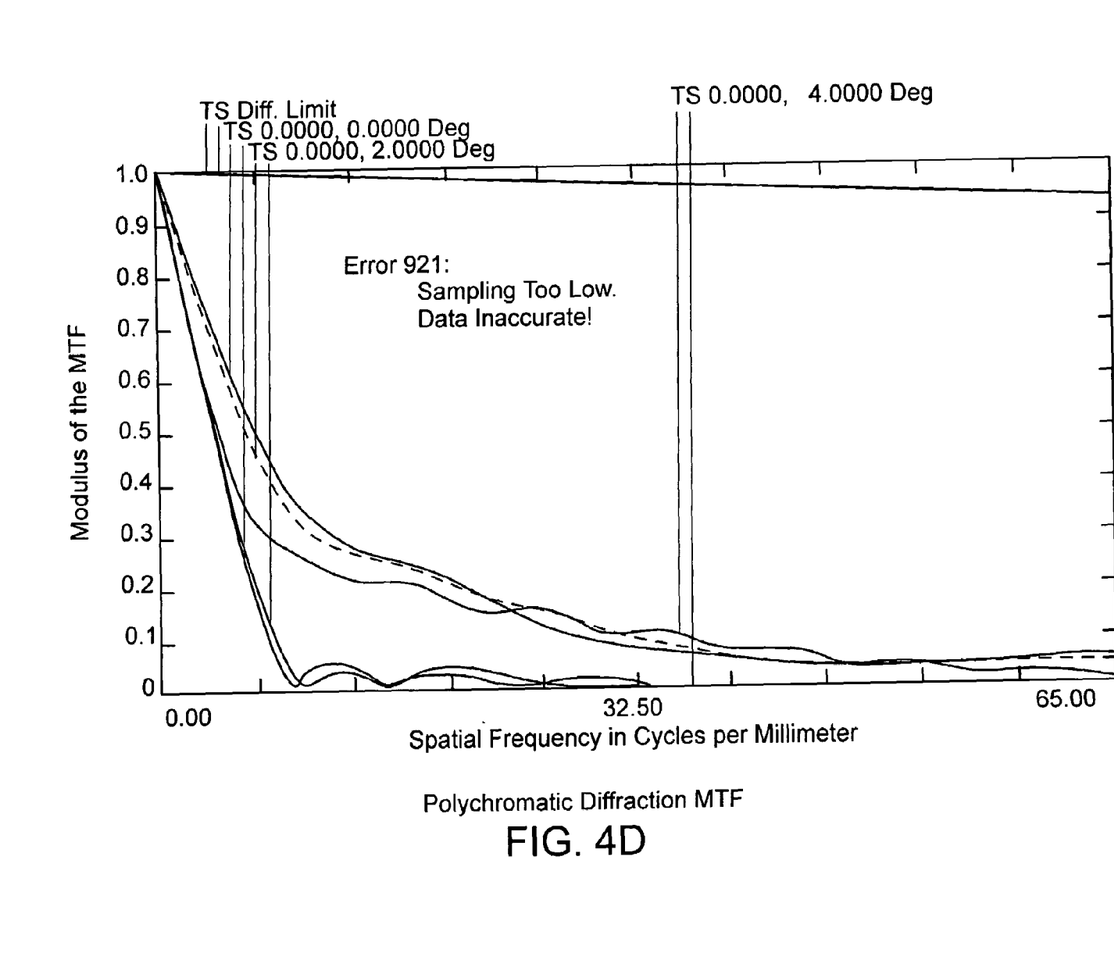
FIG. 4D is a plot showing MTF of an optical system shown in FIG. 4C as a function of spatial frequency of an image in line pairs per millimeter.

FIG. 4C is a schematic diagram illustrating refraction of rays of three different field angles (same field angles as in FIG. 4A) on an optical system that includes a perfect (aberration-free) lens and a beamsplitter (only the transmitted portions of the rays are shown). FIG. 4D is a plot depicting a modulation transfer function of the optical system shown in FIG. 4C as a function of spatial frequency. As can be seen the performance is significantly reduced from that of FIG. 4B and is substantially lower than the diffraction limit due to aberrations induced by the beamsplitter.

Figure 5A:
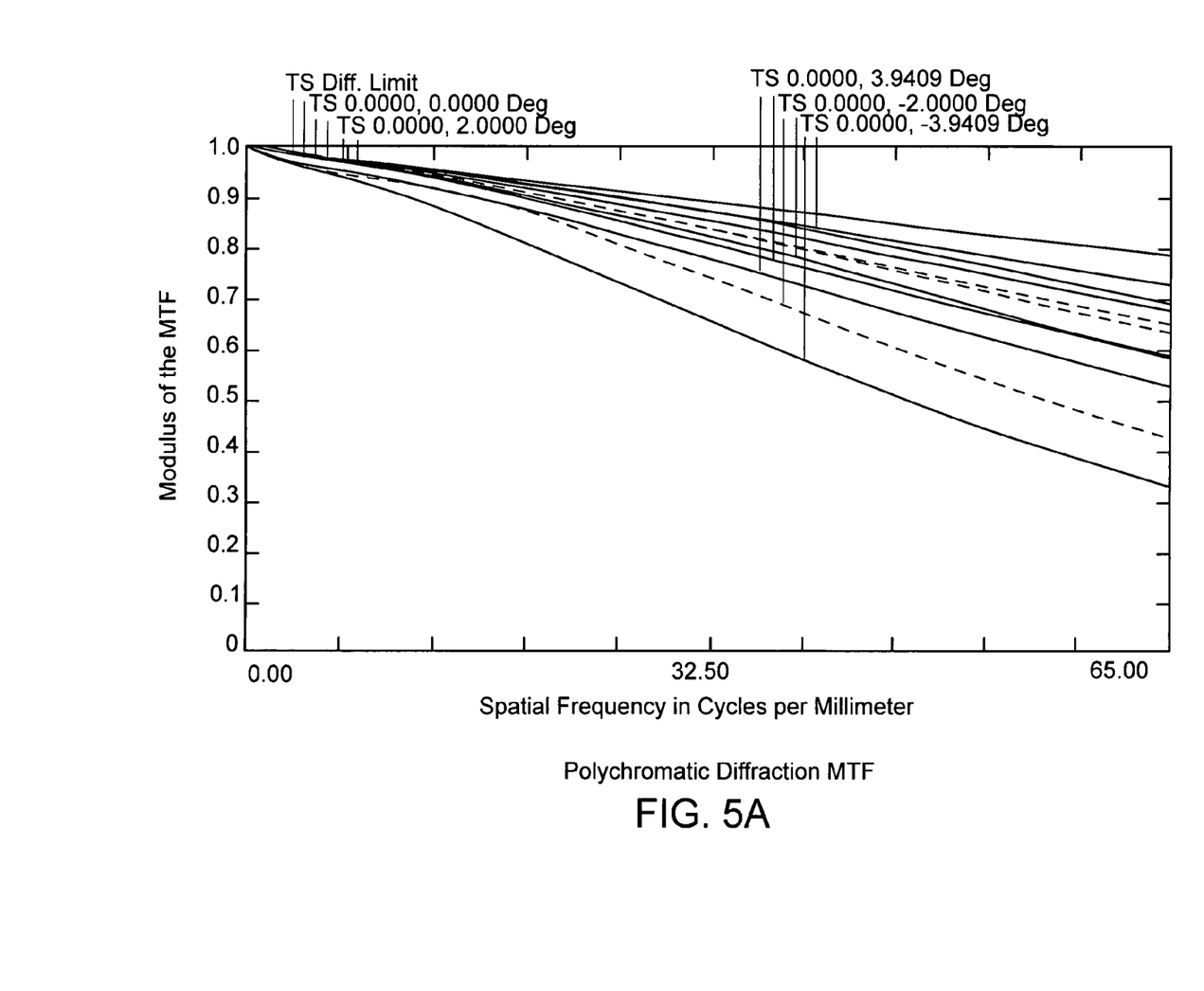
FIG. 5A is a plot showing the transmitted channel MTF of an objective piece shown in FIG. 1 as a function of spatial frequency of an image in line pairs per millimeter.
Figure 5B:
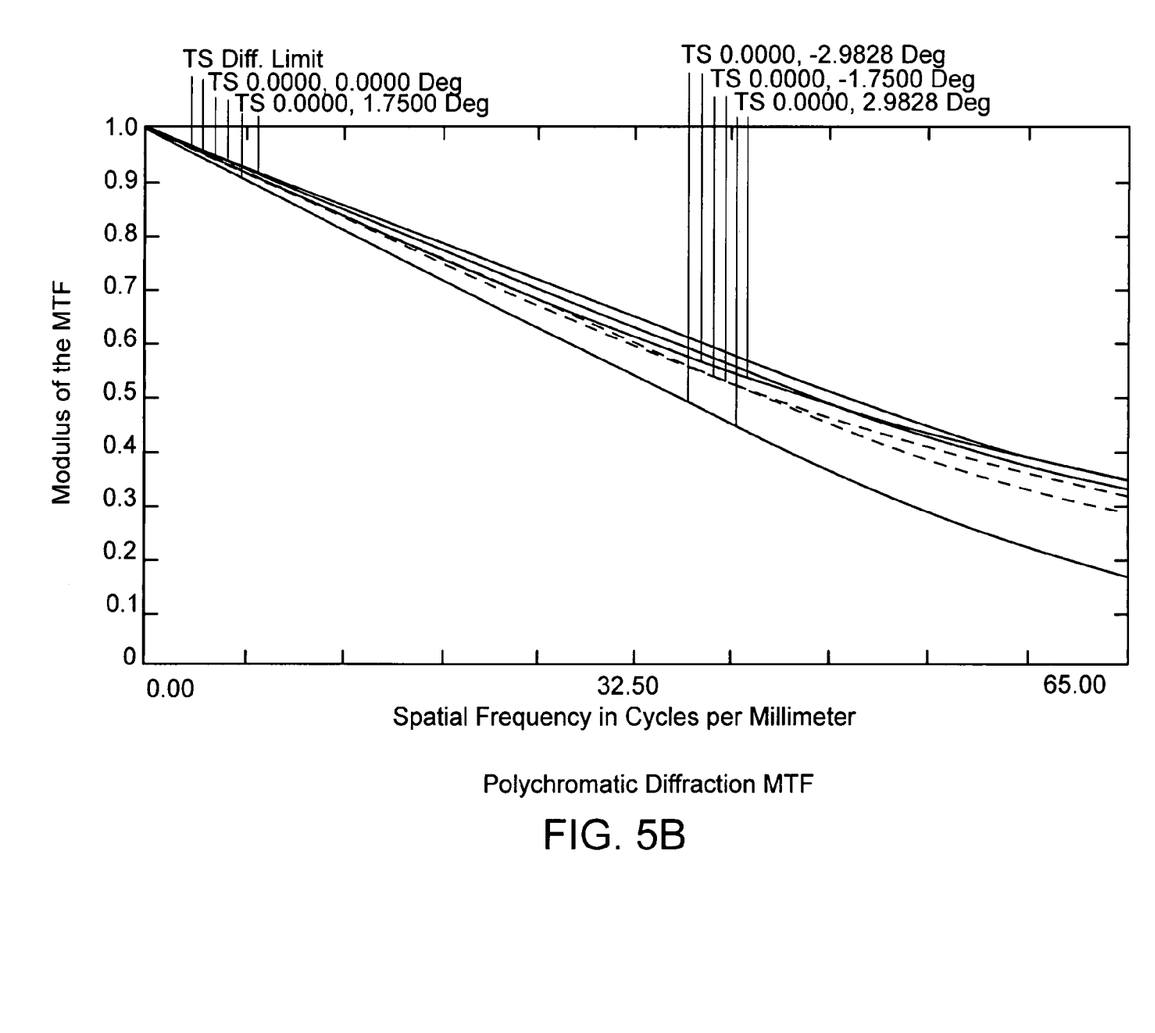
FIG. 5B is a plot showing the reflected channel MTF of an objective piece shown in FIG. 1 as a function of spatial frequency of an image in line pairs per millimeter.
Figure 6A:
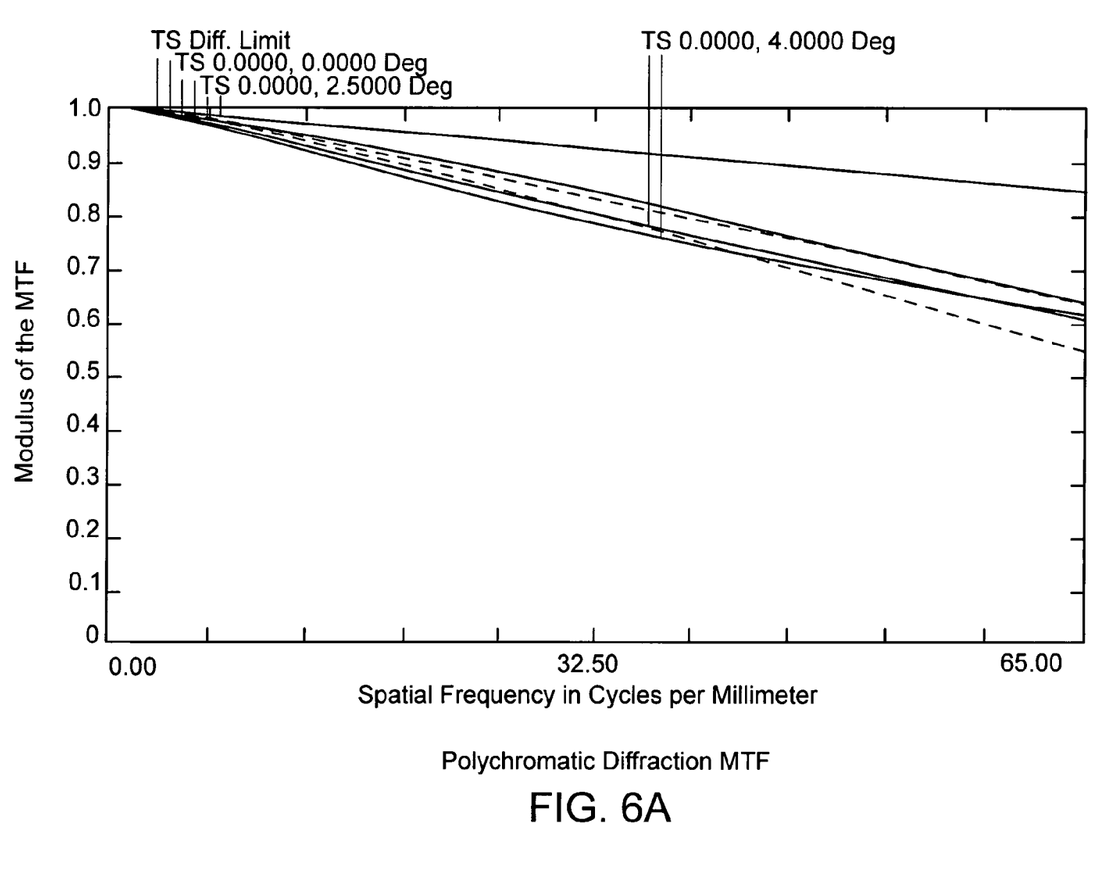
FIG. 6A is a plot showing the transmitted channel MTF of an eyepiece shown in FIG. 3 as a function of spatial frequency of an image in line pairs per millimeter.

Referring to FIGS. 5A and B and FIGS. 6A and B, the performance plots are shown up to a frequency of 65 lp/mm, the Nyquist frequency for the likely displays, and show that the eyepiece performance is limited by the display pixel size.

FIGS. 5A and 5B illustrate the modulation transfer function (MTF) of the objective assembly design illustrated in FIG. 1 for the transmitted ($I^2$) and reflected (IR) channels, respectively. It is seen from the figures that the nominal performance of both channels is near diffraction limit. While the IR channel forms a simple folded system, with the dichroic beamsplitter functioning as a fold mirror, the $I^2$ channel has transmitted through the beamsplitter and has been corrected for aberrations introduced by the beamsplitter using methods claimed herein. The represented performance of both channels is typical of performance for current state of the art systems, therefore no performance compromise is incurred by this invention.

Figure 6B:
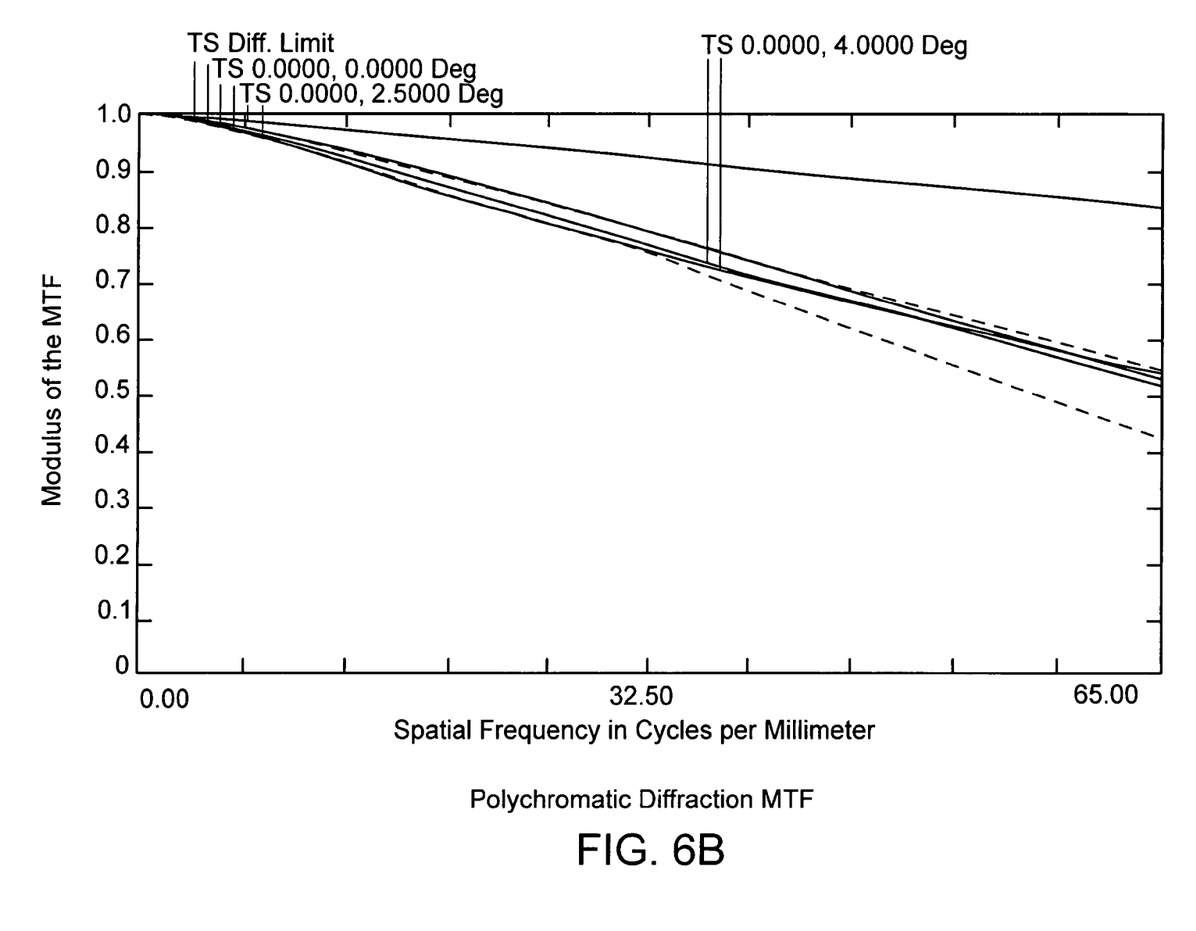
FIG. 6B is a plot showing the reflected channel MTF of an eyepiece shown in FIG. 3 as a function of spatial frequency of an image in line pairs per millimeter.

Similarly, FIGS. 6A and 6B show the MTF of the eyepiece illustrated in FIG. 3 for the transmitted ($I^2$) and reflected (IR) channels, respectively.

FIG. 7 illustrates one additional performance parameter of the optical system of the present invention—distortion.

Fusion of multiple channels and, generally, overall image resolution is dependent on matching image magnification and distortion between channels and, between objective and eyepiece within each channel. Image magnification is largely determined by focal length in each assembly. However, the focal length of each assembly, as a function of field angle, is influenced by the distortion. In fact, distortion in an optical system is defined as a change in focal length with field angle. Therefore it is critical that both the focal length and distortion for each channel be closely matched to prevent mismatch in the image overlay, which can actually degrade system resolution. Distortion match between the eyepiece and objective assemblies within each channel also allows the observer to view the scene with little or no distortion, since the distortion from each assembly cancels that from the other.

Figure 7A:
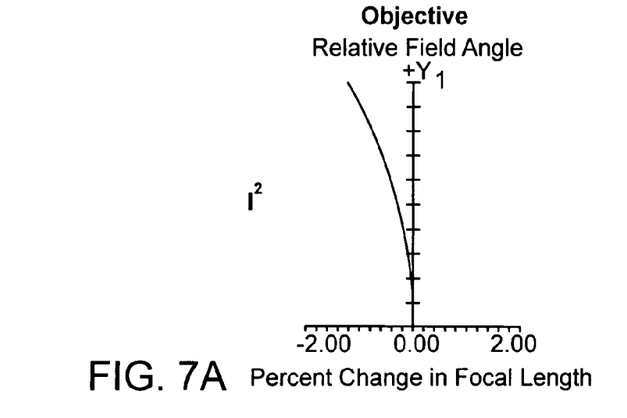
FIG. 7A is a plot of relative field angle as a function of percent change in focal length for the transmitted channel of the objective piece shown in FIG. 1.
Figure 7B:
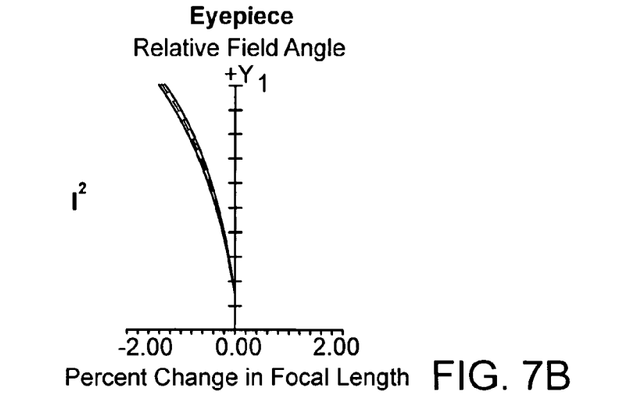
FIG. 7B is a plot of relative field angle as a function of percent change in focal length for the transmitted channel of the eyepiece shown in FIG. 3.

FIGS. 7A and B show plots of relative field angle (a measure of distortion) of the transmitted ($I^2$) channel as a functions of the percent change in focal length of either objective or eyepiece assembly of the present invention, respectively.

Figure 7C:
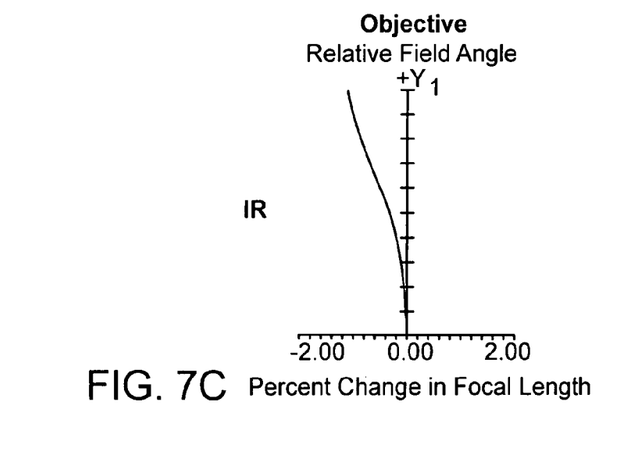
FIG. 7C is a plot of relative field angle as a function of percent change in focal length for the reflected channel of the objective piece shown in FIG. 1.
Figure 7D:
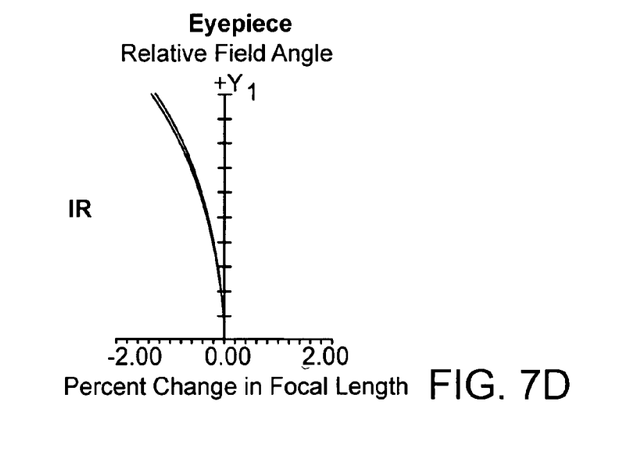
FIG. 7D is a plot of relative field angle as a function of percent change in focal length for the reflected channel of the eyepiece shown in FIG. 3.

FIGS. 7C and D show plots of relative field angle (a measure of distortion) of the reflected (IR) channel as a functions of the percent change in focal length of either objective or eyepiece assembly of the present invention, respectively.

While this invention has been particularly shown and described with references to preferred embodiments thereof, it will be understood by those skilled in the art that various changes in form and details may be made therein without departing from the scope of the invention encompassed by the appended claims.

What is claimed is:

1. An optical device, comprising:
   a dichroic beamsplitter for splitting an object beam into a reflected beam having a first waveband and a transmitted beam having a second waveband;
   an astigmatism correcting lens element, disposed in the optical path of the transmitted beam; and
   a coma correcting lens element, disposed in the optical path of the transmitted beam.

2. The device of claim 1, wherein the astigmatism correcting element includes a toroidal lens element.

3. The device of claim 1 wherein the astigmatism correcting lens element includes a cylindrical lens element.

4. The device of claim 1, wherein the coma correcting lens element includes a decentered lens element.

5. The device of claim 1, further including a common aperture objective group.

6. The device of claim 5, wherein the common aperture objective group includes a catadioptric assembly, comprising:
   a front focusing element;
   a primary mirror; and
   a secondary mirror integral with the front focusing element.

7. The device of claim 1 further including a first focal point array detector for converting the reflected beam into a first electrical signal.

8. The device of claim 7 further including a display for converting the first electrical signal into a first image beam.

9. The device of claim 8 further including an image intensifier for intensifying and converting the transmitted beam into a second image beam.

10. The device of claim 9 further including a secondary beamsplitter for fusing the first and the second image beams.

11. The device of claim 8 further including a processor for processing the first electrical signal.

12. The device of claim 8 further including a second focal point array detector for converting the transmitted beam into a second electrical signal.

13. The device of claim 12 further including an additional display for converting the second electrical signal into a second image beam.

14. The device of claim 13 further including a secondary beamsplitter for fusing the first and the second image beams.

15. The device of claim 12 further including a processor for processing the second electrical signal.

16. The device of claim 7 further including:
   a second focal point array detector for converting the transmitted beam into a second electrical signal;
   a processor for converting the first and the second electrical signals into a fused image signal; and
   a display for converting the fused image signal into a fused image beam.

17. A method of displaying images, comprising:
   directing an object beam at a dichroic beamsplitter, thereby splitting the object beam into a reflected beam having a first waveband and a transmitted beam having a second waveband;
   directing the transmitted beam at an astigmatism correcting lens element, thereby correcting the transmitted beam for astigmatic aberration; and
   directing the transmitted beam at a coma correcting lens element, thereby correcting the transmitted beam for axial coma.

18. The method of claim 17 further including
   directing the reflected beam at a first focal point array detector thereby converting the reflected beam into a first electrical signal.

19. The method of claim 18 further including
   driving a display with the first electrical signal, thereby generating a first image beam.

20. The method of claim 19, further including
   directing the transmitted beam at an image intensifier, thereby intensifying and converting the transmitted beam into a second image beam.

21. The method of claim 20, further including
   directing the first and the second image beams at a secondary beamsplitter, thereby fusing the first and the second image beams.

22. The method of claim 21, further including processing the first electrical signal.

23. The method of claim 19 further including
   directing the transmitted beam at a second focal point array detector thereby converting the transmitted beam into a second electrical signal.

24. The method of claim 23 further including
driving an additional display with the second electrical signal, thereby converting the second electrical signal into a second image beam.

25. The method of claim 24, further including
directing the first and the second image beams at a secondary beamsplitter, thereby fusing the first and the second image beams.

26. The method of claim 24, further including processing the first electrical signal.

27. The method of claim 18, further including:
directing the transmitted beam at a second focal point array detector, thereby converting the transmitted beam into a second electrical signal;
converting the first and the second electrical signals into a fused image signal; and
driving a display with the fused image signal, thereby converting the fused image signal into a fused image beam.

* * * * *